(12) United States Patent
DeLorme (10) Patent No.: US 11,932,348 B2
(45) Date of Patent: Mar. 19, 2024

(54) MOTOR ASSISTED PEDAL APPARATUS

(71) Applicant: David M. DeLorme, Freeport, ME (US)

(72) Inventor: David M. DeLorme, Freeport, ME (US)

( * ) Notice: Subject to any disclaimer, the term of this patent is extended or adjusted under 35 U.S.C. 154(b) by 511 days.

(21) Appl. No.: 17/151,156

(22) Filed: Jan. 16, 2021

(65) Prior Publication Data

US 2021/0347437 A1 Nov. 11, 2021

Related U.S. Application Data

(63) Continuation of application No. PCT/US2019/042032, filed on Jul. 16, 2019.

(60) Provisional application No. 62/699,476, filed on Jul. 17, 2018.

(51) Int. Cl.
*B62M 3/00* (2006.01)
*B62K 5/007* (2013.01)
*B62K 5/08* (2006.01)

(52) U.S. Cl.
CPC .............. *B62M 3/00* (2013.01); *B62K 5/007* (2013.01); *B62K 5/08* (2013.01); *B62K 2204/00* (2013.01)

(58) Field of Classification Search
CPC . B62M 3/00; B62K 5/007; B62K 5/08; B62K 2204/00; B62K 15/006; B62K 15/008; B62K 15/00
See application file for complete search history.

(56) References Cited

U.S. PATENT DOCUMENTS

| | | | | |
|---|---|---|---|---|
| 4,408,776 A * | 10/1983 | Randolph | .............. | B62K 3/005 280/282 |
| 4,925,202 A * | 5/1990 | Barker | .................... | B60T 1/065 280/270 |
| 5,326,121 A * | 7/1994 | Fisher | ...................... | B62K 5/08 280/231 |
| 5,388,847 A * | 2/1995 | Trammell, Jr. | .......... | B62M 1/26 74/44 |
| 5,484,152 A * | 1/1996 | Nunes | .................... | B62K 3/005 280/282 |
| 5,501,478 A * | 3/1996 | Doan | ....................... | B62K 5/02 280/282 |
| 6,247,714 B1 * | 6/2001 | Rasmussen | .............. | B62K 9/00 280/282 |
| 6,953,203 B2 * | 10/2005 | Wilcox | ................ | B62K 15/006 280/282 |
| 7,708,291 B1 * | 5/2010 | Henderson | ............... | B62K 5/10 280/771 |

(Continued)

*Primary Examiner* — Kevin Hurley
*Assistant Examiner* — Michael R Stabley
(74) *Attorney, Agent, or Firm* — Caseiro Burke LLC; Chris A. Caseiro (57) ABSTRACT

A transportation apparatus that combines pedaled and motored locomotion as selected by the rider. The apparatus includes a set of structural frames including a front frame and a rear frame. In an embodiment of the invention, the front frame and rear frame may be folded together to reduce the size of the apparatus for storage. The apparatus includes a pedal set coupled to a prime mover and motion transfer element located to the front end of the apparatus that together enable pedaled movement without a front axle. One or more rear wheels are motorized for pedal assistance or direct motorized locomotion. The apparatus is relatively low weight and can transport a plurality of passengers.

16 Claims, 6 Drawing Sheets

(56) References Cited

U.S. PATENT DOCUMENTS

| | | | |
|---|---|---|---|
| 7,909,340 B2* | 3/2011 | Henderson | B62K 5/08 |
| | | | 280/771 |
| 8,162,339 B2* | 4/2012 | James | B62M 1/36 |
| | | | 280/270 |
| 9,061,724 B2* | 6/2015 | James | B62M 1/36 |
| 9,550,540 B1* | 1/2017 | Wang | B62K 5/05 |
| 10,016,666 B2* | 7/2018 | Reimers | B62B 5/0053 |
| 10,717,491 B1* | 7/2020 | Neville | B62K 15/008 |
| 10,759,486 B2* | 9/2020 | Botti | B62K 9/02 |
| 2004/0251655 A1* | 12/2004 | Lindsay | A61G 5/023 |
| | | | 280/282 |
| 2006/0226628 A1* | 10/2006 | Lindsay | A61G 5/128 |
| | | | 280/250 |

\* cited by examiner

MOTOR ASSISTED PEDAL APPARATUS

BACKGROUND OF THE INVENTION

1. Field of the Invention

The present invention relates to pedaled apparatuses such as bicycles and surreys. The present invention is also related to motor assistance for such apparatuses. More particularly, the present invention relates to an apparatus that can be pedaled with optional motor-assisted movement.

2. Description of the Prior Art

Pedaled vehicles such as bicycles, surreys, and others have been useful forms of transportation for many years. They are used by individuals worldwide because they are easy to operate, they leverage work performed by the user, they are environmentally friendly, and they are highly maneuverable. They are also much less expensive than motorized vehicles such as cars. They also have their drawbacks, including inconvenience in poor weather and the strength necessary to operate them for extended periods of time and over uneven terrain. In general, because of at least these drawbacks, motorized vehicles tend to be a preferred mode of transport where they are available and affordable.

Motorized vehicles, on the other hand, can be difficult to operate, are highly regulated and complex devices that require substantial maintenance. In addition, they are not available to much of the population of the world due to expense, availability and access to suitable roadways. In addition, motorized vehicles are mostly pollution generators and they consume substantial resources in their manufacture and operation. Further, in congested locations, it can be difficult to park a motorized vehicle at or near a location of interest, such as the home, the store or work. In spite of these and other drawbacks, they are desirable modes of transportation. They require much less physical effort to operate as compared to a pedaled device, they can be used with convenience in poor weather and their storage capacity, whether in terms of people or goods, is substantially greater than exists with transport devices of other types, including bicycles. Motorcycles are relatively more affordable than automobiles, but they have their limitations that render them less than ideal for productive transportation.

Various hybrid combinations of bicycles and motors have been developed and commercialized for many years. In general, these vehicles, which are sometimes referred to as "e-bikes," supplement pedal power with one or more motors affixed to either or both wheels. The motor is used when supplemental power is needed, such as when the rider is going up a hill, for example. Otherwise, the rider can move the vehicle by pedaling. Licensing and/or helmet requirements may be applicable with some e-bikes, dependent on the size of the motor and resultant speed capability of the vehicle. These vehicles qualify as bicycles as they can be pedaled for locomotion. More recently, "pedelec" versions of such e-bikes have gained in interest. They include a supplemental motor, but the power supplied by the motor is limited so that vehicle speed does not exceed a threshold triggering licensure. A wide variety of pedelecs specifically, and e-bikes generally, are available in the marketplace around the world; a sign that there is a need for powered-supplemented pedaled vehicles that are suitable for the environment, useful in congested locations and are less expensive than an automobile.

Given the growing demand for e-bikes, development efforts have expanded to make the optimal motor-supplemented pedaled vehicle. In one direction are very small vehicles with two wheels, a small motor and single-seated to accommodate only one rider. This version is much like a moped or motorbike that can be pedaled. Such small vehicles are easy to maneuver and are low cost but can be uncomfortable to ride and impractical to use as they have little storage capacity. In the other direction are relatively large vehicles that look something like a surrey. They have three or four wheels, can typically accommodate a plurality of riders and the motor is sized to move the vehicle and its contents if not being pedaled. However, relatively larger e-bikes currently marketed are much more expensive than a conventional or motorized small bicycle, they require parking or storage space on the scale of an automobile, and they are relatively complex structures with axles and drive trains configured to enable locomotion by the motor and by the pedals but that also limit the ability to make the bike compact enough for storage in limited space. These and other limitations in existing e-bikes prevent the rapid expansion of interest in buying and using them.

What is needed is a motor assisted pedaled apparatus that combines the best attributes of bicycles and automobiles. In particular, what is needed is a motor assisted pedaled apparatus that is economical to purchase and use. The apparatus should be maneuverable, environmentally friendly, and easy to park and store. The apparatus should also be stable when in use and capable of transporting a plurality of riders.

SUMMARY OF THE INVENTION

It is an object of the present invention to provide a motor assisted pedaled apparatus that combines the best attributes of bicycles and automobiles. The invention is a motor assisted pedaled apparatus that is economical to purchase and use. The apparatus is maneuverable, environmentally friendly, and easy to park and store. The apparatus is also stable when in use and capable of transporting a plurality of riders.

These and other functions are accomplished in the present invention, which is a foldable motor assisted pedaled apparatus. As noted, the apparatus is a transportation apparatus that includes the best features of a bicycle and a motor vehicle. Those best features include, but are not limited to, manual operation by pedaling, which reduces manufactured energy consumption, motor-assisted locomotion when pedaling is difficult due to terrain or rider exhaustion, comfortable transport of a plurality of riders as it includes a configuration with a tandem bench seat and room for storage under or near the seat, stable maneuverability, lightweight, on the order of about 100 pounds in most configurations, for ease of pick up and placement, compact enough to be shipped, optionally compliant with laws that qualify it as a bicycle rather than a motor vehicle, sized to fit through most doorways, and foldable to allow for convenient storage in limited space.

The transportation apparatus has two front wheels and one or more rear wheels. The one or more rear wheels are motorized, and the front wheels are pedaled. This combination permits the user to switch between pedaling only, motored movement only or motor-assisted pedaling. The wheels are configured with posi-traction through differential operation of the front wheels and the rear wheels when there are two rear wheels. One or more motors used to rotate the one or more rear wheels are powered by battery. The battery or a set of batteries may be lithium-ion batteries or other forms of battery suitable for the intended function. Battery charging may be accomplished in a relatively short period of time and a full charge can provide enough power to operate the apparatus for 20 miles or more without pedaling, dependent on the load being transported and the travel terrain. The battery may be plug-in charged and/or solar charged. The apparatus may include one or more solar panels for such solar charging and the one or more panels may be applied to one or more surfaces of the apparatus. For example, the apparatus may include a cover structure extending at least over that portion of the apparatus where one or more riders sit. The cover structure may be covered with one or more solar panels.

In an embodiment of the invention, the transportation apparatus includes a frame with a front portion and a rear portion that provide a chassis for the apparatus. The frame may include a base frame, a front frame coupled to the base frame, wherein the front frame extends upward from the base frame, a prime mover coupled to the base frame, wherein the prime mover includes a hub, a pedal set coupled to the hub of the prime mover, a motion transfer element coupled to the prime mover, a jack shaft coupled to the front frame, wherein the jack shaft includes a rotatable rod, a first end and a second end, a jack shaft crank rotatably affixed to the rotatable rod of the jack shaft between the first end and the second end of the jack shaft, wherein the jack shaft crank is coupled to the motion transfer element so that rotation of the prime mover causes rotation of the jack shaft crank, a first upper wheel crank coupled to the first end of the jack shaft and a second upper wheel crank coupled to the second end of the jack shaft, a first front wheel having a hub and a second front wheel having a hub, a first lower wheel crank coupled to the hub of the first front wheel and to the first upper wheel crank, a second lower wheel crank coupled to the hub of the second front wheel and to the second upper wheel crank, a rear frame coupled to the base frame, one or more rear wheels rotatably coupled to the rear frame and one or more motors coupled to the one or more rear wheels. The prime mover may be a sprocket and the motion transfer element a chain, or the prime mover may be a pulley and the motion transfer element a belt. Any of the prime mover, the jack shaft crank and the first front wheel and the second front wheel includes a freewheel device. The first upper wheel crank may be coupled to the second wheel crank by a first belt, the second upper wheel crank may be coupled to the second lower wheel crank by a second belt, and the first belt and the second belt are selected to enable pivotal movement of the first front wheel and the second front wheel. The transportation apparatus optionally includes a steering element that may be a handle bar or other type of steering controller that is coupled to the first front wheel and the second front wheel. The transportation apparatus may include a hand brake actuator coupled to the steering element and to at least one of the one or more rear wheels. When this embodiment of the apparatus includes two rear wheels, the two rear wheels coupled together and spaced from one another by a rear axle. In that configuration, spacing between the first front wheel and the second front wheel is greater than spacing between the two rear wheels.

In another embodiment of the invention, the transportation apparatus includes the frame, which has a front portion and a rear portion. The frame in this embodiment may be formed of a base frame, a front frame coupled to the base frame, wherein the front frame extends upward from the base frame, a prime mover coupled to the base frame, wherein the prime mover includes a hub, a pedal set coupled to the hub of the prime mover, a motion transfer element coupled to the prime mover, a first front wheel and a second front wheel coupled to the motion transfer element so that rotation of the prime mover causes rotation of the first front wheel and the second front wheel, a rear frame coupled to the base frame wherein the rear frame is pivotably coupled to the base frame so that the rear frame may be pivotably moved toward the front frame to fold the transportation apparatus, one or more rear wheels rotatably coupled to the rear frame and one or more motors coupled to the one or more rear wheels. The options for the components of this embodiment that are common to the components of the first embodiment described above are the same. In addition, this embodiment optionally includes a jack shaft coupled to the front frame, wherein the jack shaft includes a rotatable rod, a first end and a second end, a jack shaft crank rotatably affixed to the rotatable rod of the jack shaft between the first end and the second end of the jack shaft, wherein the jack shaft crank is coupled to the motion transfer element so that rotation of the prime mover causes rotation of the jack shaft crank, a first upper wheel crank coupled to the first end of the jack shaft and a second upper wheel crank coupled to the second end of the jack shaft, a first lower wheel crank coupled to a hub of the first front wheel and to the first upper wheel crank and a second lower wheel crank coupled to a hub of the second front wheel and to the second upper wheel crank. In a version of this embodiment in which there are two rear wheels, they are coupled together and spaced from one another by a rear axle and spacing between the first front wheel and the second front wheel is greater than spacing between the two rear wheels, wherein pivotal movement of the rear frame fully to the front frame positions the two rear wheels at least partially between the first front wheel and the second front wheel.

In another embodiment of the invention, the transportation apparatus includes a rotatable prime mover, a motion transfer element coupled to the prime mover, a jack shaft having a rotatable rod, a first end and a second end, a jack shaft crank rotatably affixed to the rotatable rod of the jack shaft between the first end and the second end of the jack shaft, wherein the jack shaft crank is coupled to the motion transfer element so that rotation of the prime mover causes rotation of the jack shaft crank, a first upper wheel crank coupled to the first end of the jack shaft and a second upper wheel crank coupled to the second end of the jack shaft, a first front wheel having a hub and a second front wheel having a hub, a first lower wheel crank coupled to the hub of the first front wheel and to the first upper wheel crank, a second lower wheel crank coupled to the hub of the second front wheel and to the second upper wheel crank, and one or more rear wheels. These components may be coupled to a frame or chassis of the apparatus. The prime mover may be a sprocket and the motion transfer element may be a chain. Alternatively, the prime mover may be a pulley and the motion transfer element may be a belt. Each of the first front wheel and the second front wheel may include a freewheel device. Optionally, the prime mover includes a freewheel device. Optionally, the jack shaft crank includes a freewheel device. In a version of this embodiment, the first upper wheel crank is coupled to the second wheel crank by a first belt, wherein the second upper wheel crank is coupled to the second lower wheel crank by a second belt, wherein the first belt and the second belt are selected to enable pivotal movement of the first front wheel and the second front wheel. The apparatus may include a steering element coupled to the first front wheel and the second front wheel, and there may be a brake actuator.

In another embodiment, the invention is an apparatus capable of enabling movement of a transportation device. That apparatus includes a jack shaft having a rotatable rod, a first end and a second end. It also includes a jack shaft crank rotatably affixed to the rotatable rod of the jack shaft between the first end and the second end of the jack shaft, a first upper wheel crank coupled to the first end of the jack shaft and a second upper wheel crank coupled to the second end of the jack shaft, a first lower wheel crank couplable to a first front wheel of the transportation device and to the first upper wheel crank, and a second lower wheel crank couplable to a second front wheel of the transportation device and to the second upper wheel crank. This version of the invention includes a freewheel device. Further, the first upper wheel crank may be coupled to the second wheel crank by a first belt, wherein the second upper wheel crank is coupled to the second lower wheel crank by a second belt, wherein the first belt and the second belt are selected to enable pivotal movement of the first front wheel and the second front wheel.

These embodiments of the transportation apparatus of the present invention and other features thereof are more fully described in the following detailed description, accompanying drawings and appended claims.

DETAILED DESCRIPTION OF THE INVENTION

A transportation apparatus 10 of the present invention is shown in FIGS. 1-6. The apparatus 10 has a front section 12 and a rear section 14. The apparatus 10 includes a base frame 16, a front frame 18 coupled to the base frame 16 and a rear frame 20 coupled to the base frame 16. The front frame 18 extends upward from a front section 22 of the base frame 16 at locations 24 and 26 at the front end 12 of the apparatus 10. The rear frame 20 extends transversely from a rear section 28 of the base frame 16. The base frame 16, the front frame 18 and the rear frame 20 are fabricated of materials selected to provide sufficient structural support for the other components of the apparatus 10 described herein and to withstand the environment within which the apparatus 10 is expected to operate including, but not limited to hot, cold and wet conditions. For example, the base frame 16, the front frame 18 and the rear frame 20 may be fabricated of stainless steel and may be steel tubes, for example. It is to be understood that other materials may be used to make those components.

The apparatus 10 is configured to enable pedaled locomotion thereof and motorized locomotion thereof. Pedaled locomotion is conducted at the front end 12 of the apparatus 10 and motorized locomotion is conducted at the rear end 14 of the apparatus 10. For pedaled locomotion, the apparatus 10 includes a prime mover 30 in the form of a sprocket as shown, that is rotatably coupled to the base frame 16 at the front section 22. The prime mover 30 is substantially centered between first front frame leg 32 and second front frame leg 34. The prime mover 30 includes a hub 36 to which a pedal set comprising a first pedal 38 and a second pedal 40 coupled thereto on opposing sides of the prime mover 30. The pedal set is actuated by the feet of a rider sitting on seat 42 and optionally holding a steering element 44 shown in the form of a set of handlebars in substantially the way a bike such as a recumbent bike is pedaled to cause locomotion.

Figure 2:
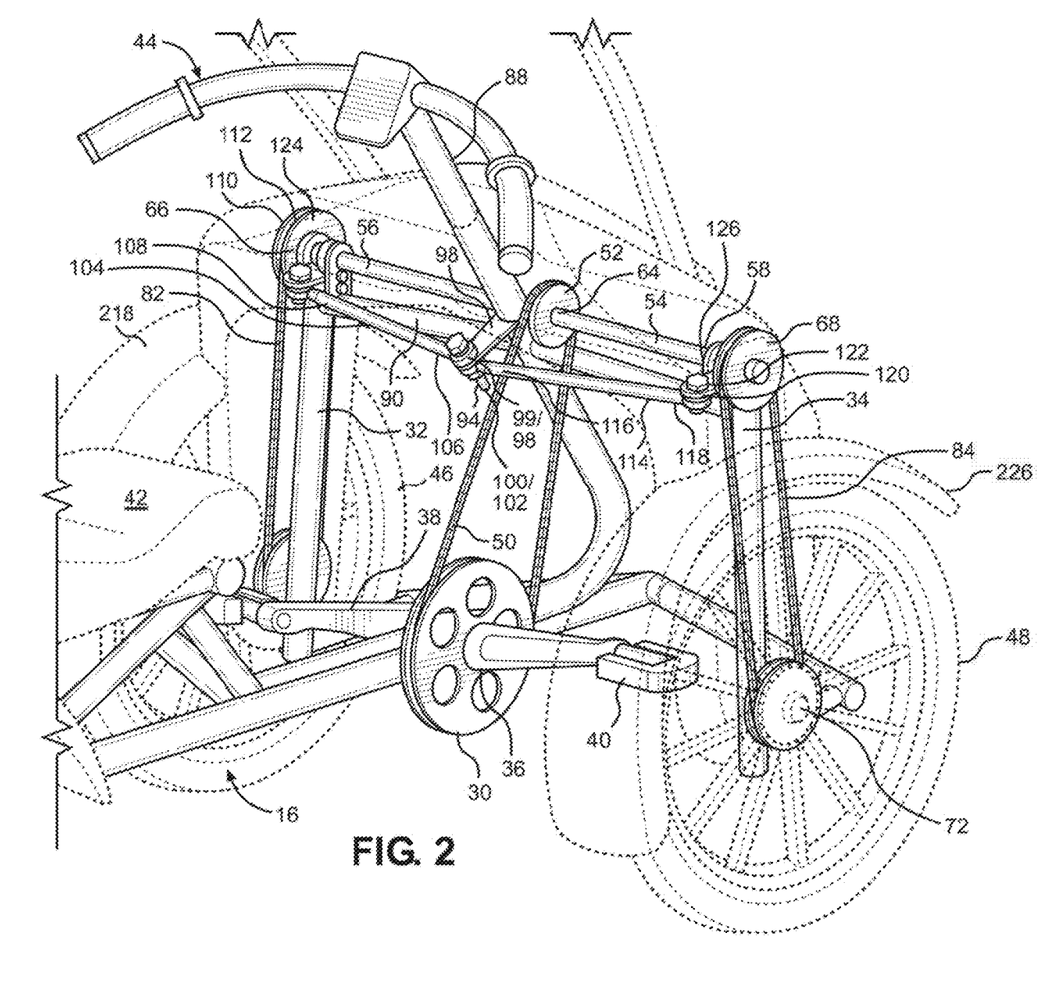
FIG. 2 is a rear perspective view of the front portion of the transportation apparatus with the front wheels and front end fairing in phantom.
Figure 5:
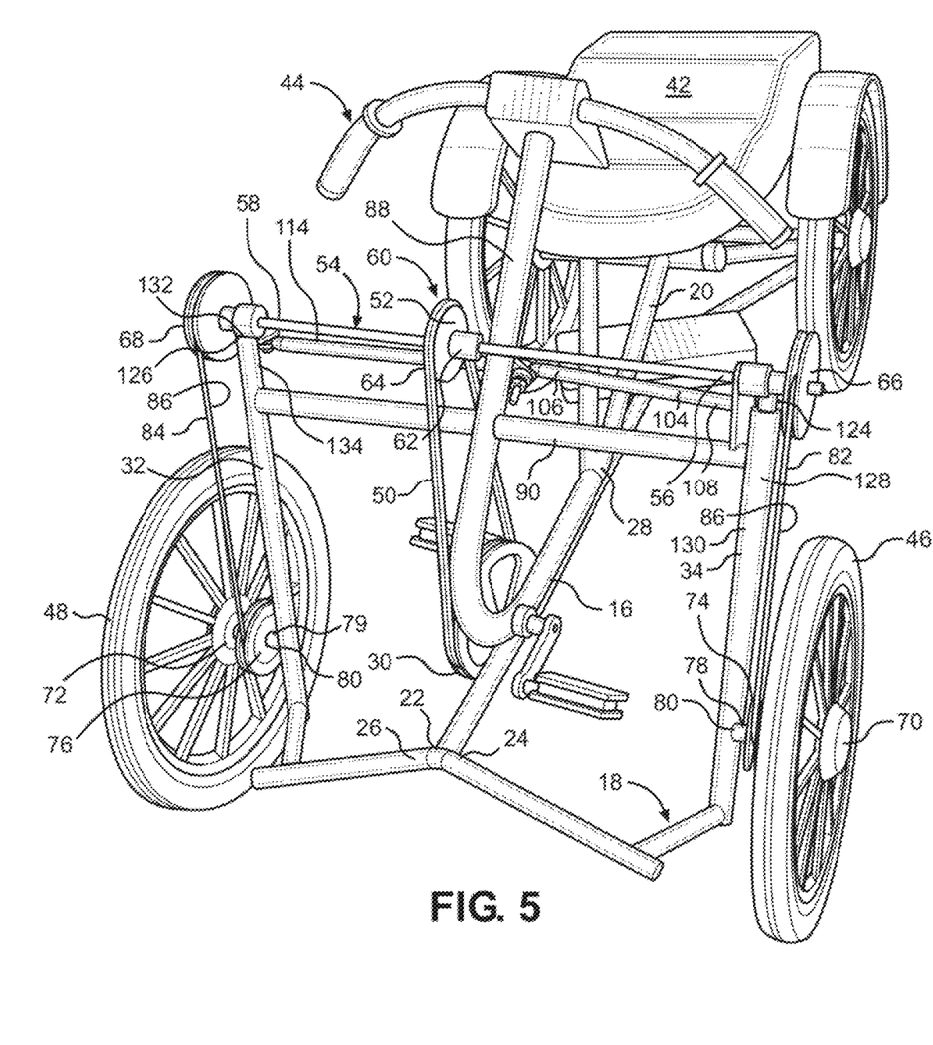
FIG. 5 is a front perspective view of the transportation apparatus without the optional cover and front end fairing.
Figure 6:
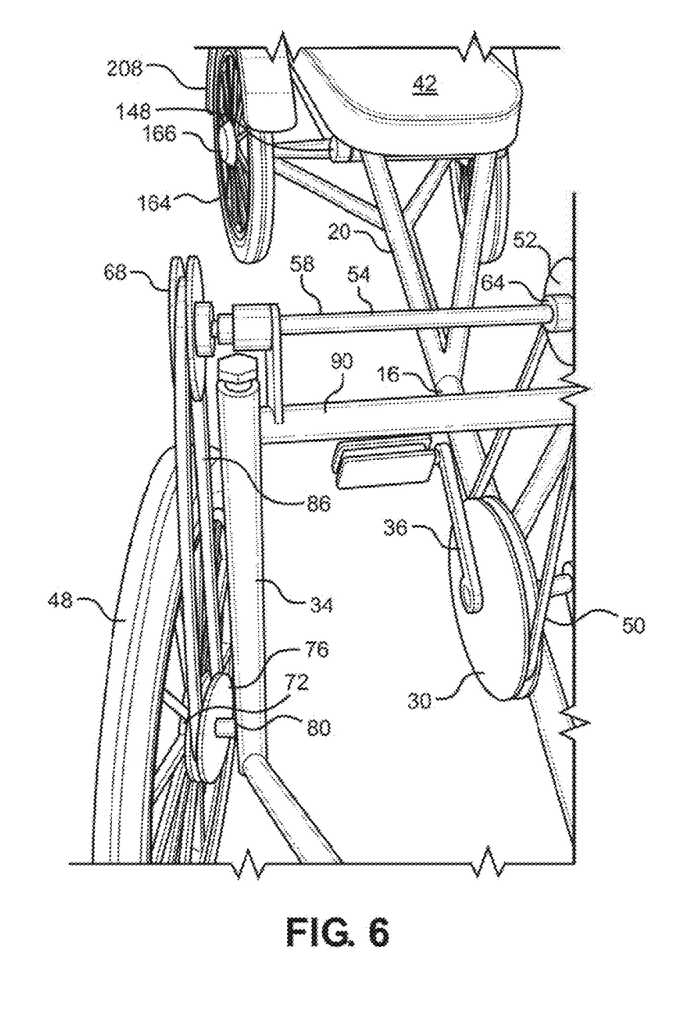
FIG. 6 is a partial sectional front view of the transportation apparatus without the optional cover and front end fairing.

In an embodiment of the invention in which there is no axle between a first front wheel 46 and a second front wheel 48, as a further aspect of pedaled locomotion of the apparatus 10, the prime mover 30 is coupled to a transfer element 50 shown as a chain in the drawings that is set about sprocket teeth of the prime mover 30 as shown. Rotation of the prime mover 30 caused by rotation of the pedal set causes rotational movement of the transfer element 50. The transfer element 50 is further set about a jack shaft crank 52 also represented as sprocket with teeth so that actuation of the pedal set causes rotational movement of the jack shaft crank 52. The jack shaft crank 52 is positioned above the prime mover 30 so that the transfer element 50 rotates above the base frame 16. The jack shaft crank 52 is rotatably affixed about a jack shaft 54 in the form of a rotatable rod that includes a first end 56 and a second end 58 with the jack shaft crank 52 substantially centered therebetween. The jack shaft 54 is rotatably affixed to the front frame 18 at location 60 in socket braces 62 and 64 that allow rotation of the jack shaft 54 upon rotation of the jack shaft crank 52 with little or no axial or transverse motion thereof.

The first end 56 of the jack shaft 54 is rotatably coupled to a first upper wheel crank 66 and the second end 58 of the jack shaft 54 is rotatably coupled to a second upper wheel crank 68. Rotational movement of the jack shaft 54 causes rotational movement of the first upper wheel crank 66 and the second upper wheel crank 68. The first upper wheel crank 66 and the second upper wheel crank 68 are shown in the form of wheels with inset stepped perimeters. Other configurations of those components are possible provided they are rotatable and configured to cause rotational movement of a coupling that in turn causes rotational movement of the first front wheel 46 and the second front wheel 48.

The first front wheel 46 includes a hub 70 and the second front wheel 48 includes a hub 72. A first lower wheel crank 74 is rotatably affixed about the hub 70 and a second lower wheel crank 76 is rotatably affixed about the hub 72. Each of the hubs 70 and 72 includes a structural support rod 78 extending from the hub 70/72 through the first lower wheel crank 74 for the first front wheel 46 and the second lower wheel crank 76 for the second front wheel 48. The support rods 78 are not coupled to the wheel cranks 74 and 76. Instead, they terminate and have ends retained within portals 80 of the first front frame leg 32 and the second front frame leg 34, respectively, of the front frame 18. The portals 80 may be slotted to allow for pivotal movement of the first front wheel 46 and the second front wheel 48 about the first front frame leg 32 and the second front frame leg 34, respectively, for turning of the transportation apparatus 10 left and right while underway. The first lower wheel crank 74 and the second lower wheel crank 76 are shown in the form of wheels with inset stepped perimeters. Other configurations of those components are possible provided they are rotatable and configured to be rotated upon rotational movement of the coupling that moves with rotation of the first upper wheel crank 66 and the second upper wheel crank 68.

The coupling between the first upper wheel crank 66 and the first lower wheel crank 74, and the coupling between the second upper wheel crank 68 and the second lower wheel crank 76 is selected with sufficient structural integrity to enable the rotation of both components and flexible enough to enable pivotal movement of the first front wheel 46 and the second front wheel 48 for turning of the apparatus 10 without loss of the engagement that causes rotational movement of those wheels. As shown in the drawings, a first belt 82 couples the first upper wheel crank 66 to the first lower wheel crank 74, and a second belt 84 couples the second upper wheel crank 68 to the second lower wheel crank 76. The belts 82 and 84 are fabricated of a flexible material such as a viscoelastic material that may be a polymeric material, a rubber material or a combination thereof. Interior surfaces of the belts include teeth or steps 86 that engage the perimeter steps of the upper and lower wheel cranks. The belts 82 and 84 rotate with rotation of the jack shaft 54 and they continue to do so while twisted, such as when the wheels 46 and 48 are turned. The use of a flexible transfer element is an advantage of the present invention in that it enables pedaled locomotion and turning of the apparatus 10 without the need of a universal joint and axle extending between the first front wheel 46 and the second front wheel 48. The elimination of a front axle enables folding of the transportation apparatus 10 to reduce its size for parking and storage convenience.

The transportation apparatus 10 may be turned right and left by the user with the steering element 44. The steering element 44 is shown as a set of handlebars and is part of a steering system of the apparatus 10. Other forms of steering mechanism are possible. As illustrated, the steering element 44 is coupled to steering column 88. The steering column 88 is rotatably coupled to the front frame 18 at crossbar 90. The steering column 88 includes a junction flange 92 extending rearward. The junction flange 92 includes a portal through which a junction rod 94 extends. A first rotatable bushing 96 with coupling extension 98 and a second rotatable bushing 100 with coupling extension 102 are retained about the junction rod 94.

A first steering rod 104 includes a first end 106 that is removably engaged with the coupling extension 98 of the first rotatable bushing 96, and a second end 108. The second end 108 is removably engaged with a coupling extension 110 of a third rotatable bushing 112. A second steering rod 114 includes a first end 116 that is removably engaged with the coupling extension 98 of the second rotatable bushing 100, and a second end 118. The second end 118 is removably engaged with a coupling extension 120 of a fourth rotatable bushing 122. The third rotatable bushing 112 is retained about a first wheel junction rod 124 and the fourth rotatable bushing 122 is retained about a second wheel junction rod 126. The first wheel junction rod 124 is retained in a port of a first end of a first wheel flange 128.

A second end of the first wheel flange 128 is coupled to a first end of a first turning cylinder 130 that is housed within the first front frame leg 32. The first turning cylinder 130 extends substantially the length of the first front frame leg 32 and has a second end that is coupled to support rod 78 of the hub 70 of the first front wheel 46. The second wheel junction rod 126 is retained in a port of a first end of a second wheel flange 132. A second end of the second wheel flange 132 is coupled to a first end of a second turning cylinder 134 that is housed within the second front frame leg 34. The second turning cylinder 134 extends substantially the length of the second front frame leg 34 and has a second end that is coupled to support rod 78 of the hub 72 of the second front wheel 48.

In operation, when the steering element 44 is moved to cause the apparatus 10 to turn left or right, resultant movement of the first turning cylinder 130 causes movement of the support rod 78 of the hub 70 of the first front wheel 46 within the portal 80 of the first front frame leg 32. In addition, and at the same time, that movement of the steering element 44 causes movement of the support rod 78 of the hub 72 of the second front wheel 48 within the portal 80 of the second front frame leg 34. Those of skill in the art will recognize that other mechanisms for causing the apparatus 10 to turn left or right are possible. Those of skill in the art will also recognize that the hubs 70 and 72 of the first front wheel 46 and the second front wheel 48 may include a freewheel device to establish a differential of wheel rotation during the course of a turning of the apparatus. A freewheel device may also be employed on the pedal set to prevent motion of the pedals when the apparatus is moved by one or more motors used to assist or replace pedaled locomotion when desired.

Figure 3:
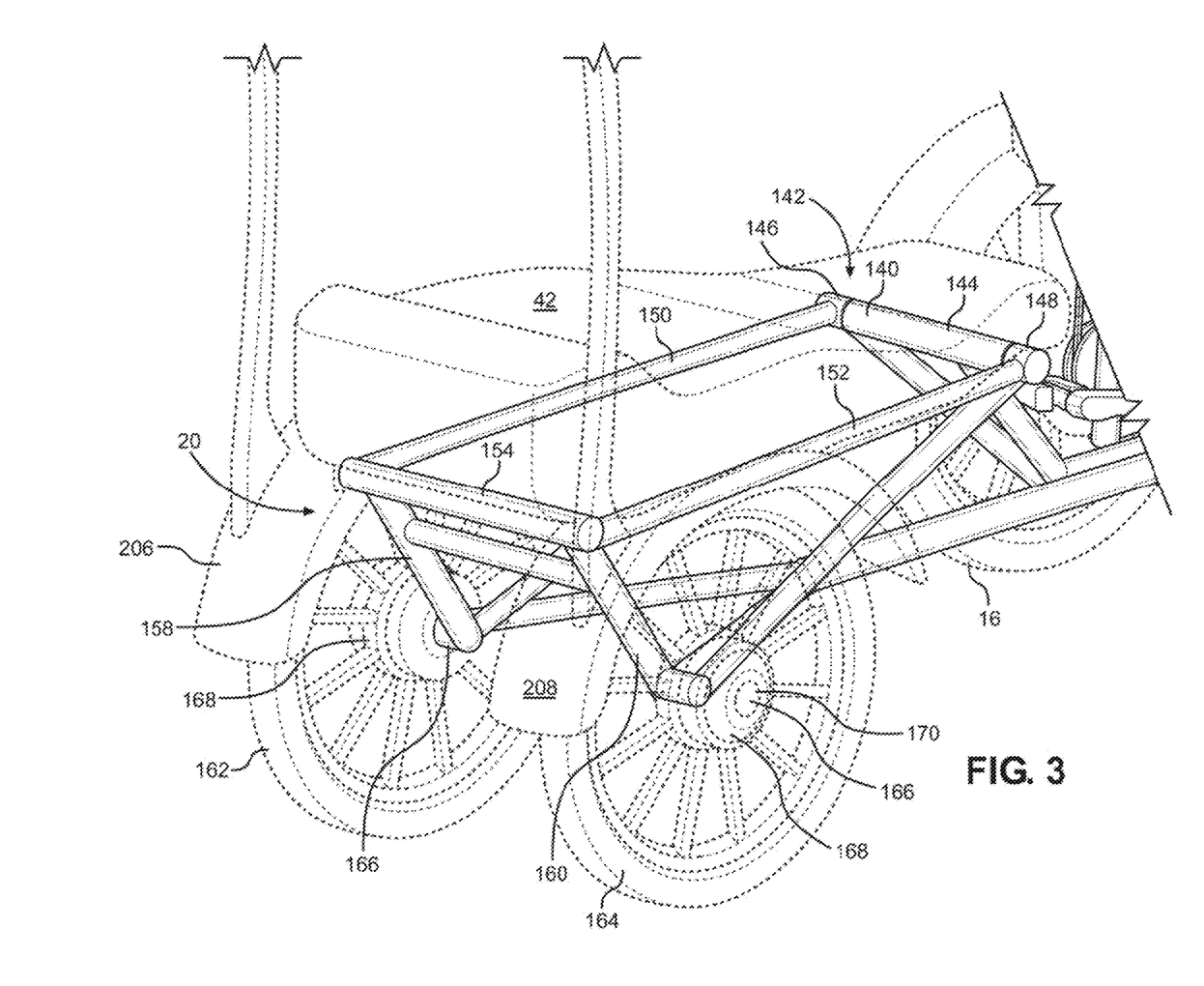
FIG. 3 is a rear perspective view of the rear portion of the transportation apparatus with the rear wheels and seat in phantom.

As earlier stated, motorized locomotion of the apparatus 10 occurs at the rear end 14 thereof. The rear frame 20 includes a first crossbar 140 rotatably affixed to the base frame 16 at location 142. The first crossbar 140 includes a center bar 144 that is rotatably retained in a first retaining tube 146 and a second retaining tube 148. This configuration enables rotation of the rear frame 20 with respect to the base frame 16 at location 142 so that the apparatus 10 may be folded into a compact form when desired. That same configuration is structurally sound when the apparatus 10 is in motion.

The first crossbar 140 is also coupled to a first upper seat support bar 150 and a second upper seat support bar 152 at first ends thereof, and a second crossbar 154 is coupled to the first upper seat support bar 150 and the second upper seat support bar 152 at second ends thereof. Seat 42 in the form of a bench as shown or other seating apparatus is removably attached to the first upper seat support bar 150 and the second upper seat support bar 152. A first rear wheel tube 158 extends orthogonally from a first end of the second crossbar 154 and a second rear wheel tube 160 extends orthogonally from a second end of the second crossbar 154. A first rear wheel 162 is rotatably coupled to the first rear wheel tube 158 and a second rear wheel 164 is rotatably coupled to the second rear wheel tube 160.

Figure 4:
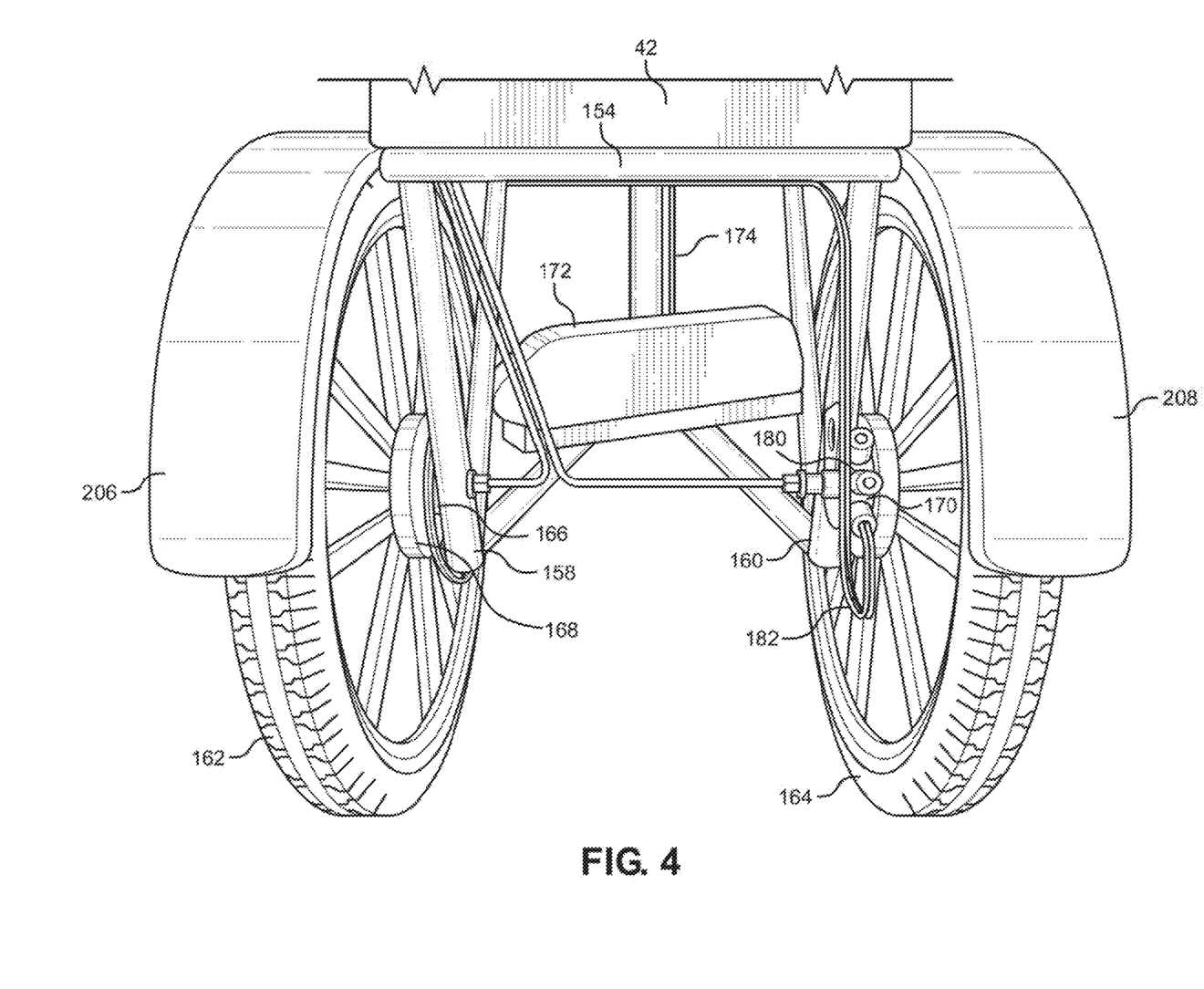
FIG. 4 is a rear view of the transportation apparatus.

Each of the first rear wheel 162 and the second rear wheel 164 includes a centered hub 166 that is configured to contain therein an electric motor 168 having a selectable horsepower. The electric motors 168 may form an integral part of the wheels 162 and 164 or they may be separately configured and connected to the wheels 162 and 164. The motor 168 is engaged with a shaft 170 that is rotatably retained to respective ones of the first rear wheel tube 158 and the second rear wheel tube 160. The motor 168 is centered in the wheels 162 and 164, allowing the motor 168 to be attached directly to the chassis of the apparatus 10. Having a motor 168 on each hub 166 allows each wheel 162/164 to spin at different speeds, thereby negating the need for a differential while still avoiding a skid during a turn. Each motor 168 is coupled to a controller station 172 that contains one or more batteries that may be solar charged. The controller station 172 is optionally coupled by wiring 174 to a control panel 176 and status display 178 that are positioned on or adjacent to the steering element 44.

At least one of the wheels 162 and 164 includes a braking apparatus 180, such as a disk brake mechanism but other braking options are possible. The braking apparatus 180 is coupled by wiring 182 to a brake controller 184 that may be located on or near the steering element 44. The braking apparatus 180 may be a brake disk attached directly to the motor 168. When a user pulls on the brake controller 184, a caliper of the braking apparatus 180 presses pads of the brake disk, thereby slowing rotation of the motor 168 and thus, the wheel 162/164. Simultaneously, actuation of the brake controller 184 triggers activation of software arranged as part of the controller station 172 to activate regenerative braking. Regenerative braking as part of the apparatus 10 converts kinetic energy of rotation of the motor 168 into electrical energy. That is, the motor 168 performs as a generator to charge one or more batteries coupled to the controller station 172 while slowing down the apparatus 10. This extends the mileage available to locomotion of the apparatus 10 using the one or more batteries to charge the motor 168. The regenerative braking provided by the motor assists the braking provided by the brake disk, the combination of which allows more precise, comfortable and faster braking control. It is to be understood that other forms of braking may be employed. For example, and without limitation, one or more motors 168 could be configured to transfer power to a rear differential or directly to an axle, one or more disk brakes could be coupled directly to an axle, or rim brakes could be used on the wheels 162 and 164.

Figure 1:
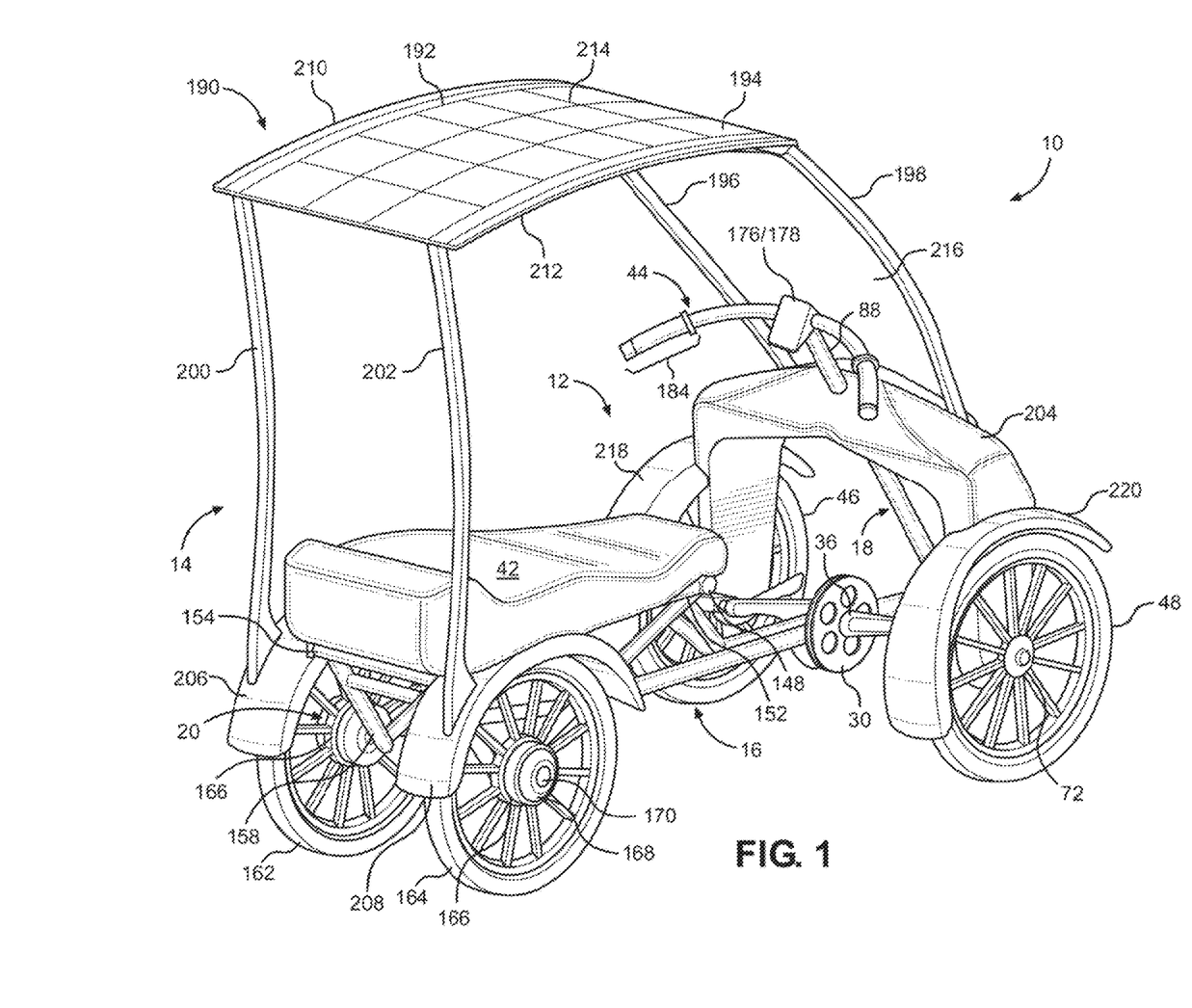
FIG. 1 is a rear perspective view of the transportation apparatus of the present invention including optional cover and front end fairing.

The apparatus 10 may include an optional cover apparatus 190 including a cover 192 and a cover frame 194. The cover frame 194 includes front frame bars 196 and 198, and rear frame bars 200 and 202. The front frame bars 196 and 198 are permanently or removably affixed to the front frame 18, or to a fairing 204 that extends over the front frame 18 and the jack shaft subsystem. The fairing 204 may be fabricated of a nonmetallic material and designed with a desirable shape and appearance. The rear frame bars 200 and 202 are permanently or removably affixed to the rear frame 20 such as at second crossbar 154, or to rear fenders 206 and 208 that extend about the rear wheels 162 and 164. The cover 192 includes structural members 210 and 212 that are coupled to the front frame bars 196 and 198 and to the rear frame bars 200 and 202. The cover 192 also includes a plastic, fabric or metallic sheet 214 that extends between the structural members 210 and 212 so that it can cover at least one or more riders located on the bench seat 156. The cover 192 may be formed of an array of solar cells coupled to the controller station 172 for connection to the one or more batteries. An optional windshield 216 may be positioned between the front frame bars 196 and 198. The windshield 216 is substantially transparent and may be made of glass or plastic. The front wheels 46 and 48 may also include front fenders 218 and 220, respectively. One or more storage compartments may be established in or under the bench seat 156.

The invention has been described with respect to a specific example embodiment. It is to be understood that those of skill in the art will see that other equivalent configurations are possible without deviating from the scope of the invention as defined by the appended claims.

What is claimed is:

1. A transportation apparatus comprising:
   a rotatable prime mover;
   a motion transfer element coupled to the prime mover;
   a jack shaft having a rotatable rod, a first end and a second end;
   a jack shaft crank rotatably affixed to the rotatable rod of the jack shaft between the first end and the second end of the jack shaft, wherein the jack shaft crank is coupled to the motion transfer element so that rotation of the prime mover causes rotation of the jack shaft crank;
   a first upper wheel crank coupled to the first end of the jack shaft and a second upper wheel crank coupled to the second end of the jack shaft;
   a first front wheel having a hub and a second front wheel having a hub;
   a first lower wheel crank coupled to the hub of the first front wheel and to the first upper wheel crank;
   a second lower wheel crank coupled to the hub of the second front wheel and to the second upper wheel crank; and
   one or more rear wheels.

2. The transportation apparatus of claim 1 wherein the prime mover is a sprocket, and the motion transfer element is a chain.

3. The transportation apparatus of claim 1 wherein the prime mover is a pulley, and the motion transfer element is a belt.

4. The transportation apparatus of claim 1 wherein each of the first front wheel and the second front wheel includes a freewheel device.

5. The transportation apparatus of claim 1 wherein the prime mover includes a freewheel device.

6. The transportation apparatus of claim 1 wherein the jack shaft crank includes a freewheel device.

7. The transportation apparatus of claim 1 wherein the first upper wheel crank is coupled to the second wheel crank by a first belt, wherein the second upper wheel crank is coupled to the second lower wheel crank by a second belt, wherein the first belt and the second belt are selected to enable pivotal movement of the first front wheel and the second front wheel.

8. The transportation apparatus of claim 1 further comprising a steering element coupled to the first front wheel and the second front wheel.

9. The transportation apparatus of claim 1 further comprising a brake actuator.

10. An apparatus to enable movement of a transportation device, the apparatus comprising:
    a jack shaft having a rotatable rod, a first end and a second end;
    a jack shaft crank rotatably affixed to the rotatable rod of the jack shaft between the first end and the second end of the jack shaft;
    a first upper wheel crank coupled to the first end of the jack shaft and a second upper wheel crank coupled to the second end of the jack shaft;
    a first lower wheel crank couplable to a first front wheel of the transportation device and to the first upper wheel crank; and
    a second lower wheel crank couplable to a second front wheel of the transportation device and to the second upper wheel crank.

11. The apparatus of claim 10 wherein the jack shaft crank includes a freewheel device.

12. The apparatus of claim 10 wherein the first upper wheel crank is coupled to the second wheel crank by a first belt, wherein the second upper wheel crank is coupled to the second lower wheel crank by a second belt, wherein the first belt and the second belt are selected to enable pivotal movement of the first front wheel and the second front wheel.

13. A transportation apparatus comprising:
a base frame;
a front frame coupled to the base frame, wherein the front frame extends upward from the base frame;
a prime mover rotatably coupled to the base frame, wherein the prime mover includes a hub;
a pedal set coupled to the hub of the prime mover;
a motion transfer element coupled to the prime mover;
a jack shaft coupled to the front frame, wherein the jack shaft includes a rotatable rod, a first end and a second end;
a jack shaft crank rotatably affixed to the rotatable rod of the jack shaft between the first end and the second end of the jack shaft, wherein the jack shaft crank is coupled to the motion transfer element so that rotation of the prime mover causes rotation of the jack shaft crank;
a first upper wheel crank coupled to the first end of the jack shaft and a second upper wheel crank coupled to the second end of the jack shaft;
a first front wheel having a hub and a second front wheel having a hub;
a first lower wheel crank coupled to the hub of the first front wheel and to the first upper wheel crank;
a second lower wheel crank coupled to the hub of the second front wheel and to the second upper wheel crank;
a rear frame coupled to the base frame;
one or more rear wheels rotatably coupled to the rear frame; and
one or more motors coupled to each of the one or more rear wheels.

14. The transportation apparatus of claim 13 wherein the prime mover is a sprocket, and the motion transfer element is a chain.

15. The transportation apparatus of claim 13 wherein the prime mover is a pulley, and the motion transfer element is a belt.

16. The transportation apparatus of claim 13 wherein each of the first front wheel and the second front wheel includes a freewheel device.

* * * * *